United States Patent
Beneditz et al.

(10) Patent No.: US 8,576,522 B2
(45) Date of Patent: Nov. 5, 2013

(54) SHUNT REGULATOR AT EXCITATION OUTPUT OF GENERATOR CONTROL UNIT FOR OVERVOLTAGE PROTECTION

(75) Inventors: Bruce D. Beneditz, Roscoe, IL (US); John N. Buzzard, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 440 days.

(21) Appl. No.: 12/914,567

(22) Filed: Oct. 28, 2010

(65) Prior Publication Data

US 2012/0106009 A1 May 3, 2012

(51) Int. Cl.
*H02H 9/00* (2006.01)
(52) U.S. Cl.
USPC .......................................................... 361/52
(58) Field of Classification Search
USPC .......................................................... 361/52
See application file for complete search history.

(56) References Cited

U.S. PATENT DOCUMENTS

| | | |
|---|---|---|
| 2,832,900 A | 4/1958 | Ford |
| 3,771,043 A | 11/1973 | Zulaski |
| 4,659,978 A | 4/1987 | Dogadko |
| 4,973,896 A * | 11/1990 | Shiga et al. ............... 322/28 |
| 5,333,105 A * | 7/1994 | Fortune ................... 363/56.11 |
| 5,414,611 A | 5/1995 | Muto et al. |
| 6,984,959 B2 * | 1/2006 | Satake et al. ............. 318/720 |

OTHER PUBLICATIONS

Horowitz et al., The Art of Electronics, 2006, The Press Syndicate of the University of Cambridge, Second Edition, 229-230.*

* cited by examiner

*Primary Examiner* — Rexford Barnie
*Assistant Examiner* — Tien Mai
(74) *Attorney, Agent, or Firm* — Cantor Colburn LLP

(57) ABSTRACT

An electrical system includes a generator; a generator control unit connected to the generator; and a shunt regulator connected to an excitation output of the generator control unit, wherein the shunt regulator is configured to overload the excitation output of the generator control unit in the event of an overvoltage condition in the electrical system, such that an output voltage of the generator does not exceed a predetermined ceiling voltage during the overvoltage condition.

19 Claims, 3 Drawing Sheets

SHUNT REGULATOR AT EXCITATION OUTPUT OF GENERATOR CONTROL UNIT FOR OVERVOLTAGE PROTECTION

FIELD OF INVENTION

The subject matter disclosed herein relates generally to the field of overvoltage protection in an electrical generating system.

DESCRIPTION OF RELATED ART

Overvoltage conditions in an electrical generating system may cause damage to electrical loads, including alternating current (AC) or direct current (DC) loads, powered by the electrical generating system. For example, an aircraft electric power system may have various loads, including loads that include circuitry that is critical for flight operations, powered by a generator in the electrical generating system. Overvoltage conditions from the generator may result in a catastrophic event in the aircraft due to exposure of a critical load to a voltage outside the load's rated limits, which may cause the critical load to fail.

One way of preventing overvoltage in an electrical generating system is to provide one or more overvoltage protection modules in a generator control unit (GCU) that is connected to the generator. A constant frequency (CF) generator may magnetically saturate at a voltage below the maximum ceiling voltage tolerated by the connected loads. This gives time for the overvoltage protection module(s) to de-excite and disconnect the generator from the loads. However, if the generator is a variable frequency (VF) generator, a maximum ceiling voltage may be produced that is far in excess of the maximum ceiling voltage rated for the electrical system. Also, the voltage rise for a VF generator due to a failed on excitation may be too fast to protect with the traditional overvoltage protection circuitry; the overvoltage may be on the bus for a period of time of 10 s or 100 s of milliseconds (ms) before the overvoltage is detected by an overvoltage protection module and the generator is taken off line, allowing the overvoltage to be experienced by loads powered by the generator, which may including flight critical equipment in an aircraft electrical generating system that may act in an adverse way or suffer damage when exposed to the overvoltage.

BRIEF SUMMARY

According to one aspect of the invention, an electrical system includes a generator; a generator control unit connected to the generator; and a shunt regulator connected to an excitation output of the generator control unit, wherein the shunt regulator is configured to overload the excitation output of the generator control unit in the event of an overvoltage condition in the electrical system, such that an output voltage of the generator does not exceed a predetermined ceiling voltage during the overvoltage condition.

According to another aspect of the invention, a method for limiting an overvoltage condition in an electrical system by a shunt regulator connected to an excitation output of a generator control unit of the electrical system includes activating the shunt regulator in response to the overvoltage condition; and overloading the excitation output of the generator control unit by the shunt regulator such that an output voltage of a generator connected to the generator control unit does not exceed a predetermined ceiling voltage during the overvoltage condition.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a shunt regulator at a GCU excitation output for overvoltage protection, and a method of operating a shunt regulator at a GCU excitation output for overvoltage protection, are provided, with exemplary embodiments being discussed below in detail. The shunt regulator limits the output of a generator attached to the GCU to a voltage that is below a predetermined ceiling voltage at which loads powered by the electrical generating system may be damaged. As a result, a predetermined ceiling voltage of the loads is not exceeded during overvoltage conditions. The predetermined ceiling voltage may be less than the voltage require to trigger the overvoltage protection module, or greater than the overvoltage protection limits required to trigger an overvoltage protection module, in which case the shunt regulator acts to protect the loads during a period of time in which a relatively slow overvoltage protection module is reacting to the overvoltage by, for example, and shutting down the generator or taking the generator offline. The shunt regulator does not allow the generator output to exceed the predetermined ceiling voltage, even in situations with a failed on exciter drive in the electrical generating system.

Figure 1:
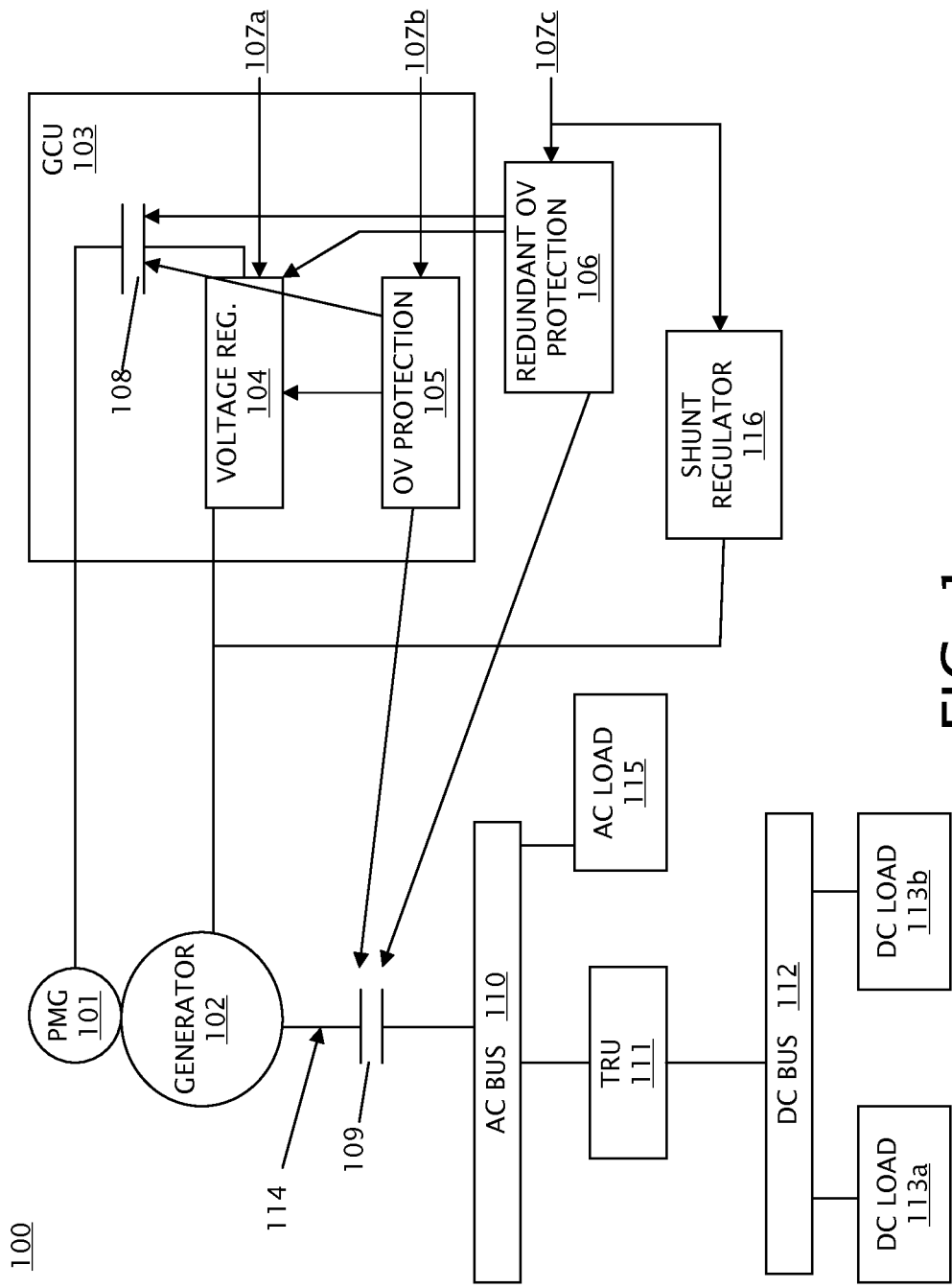
FIG. 1 illustrates an embodiment of an electrical generating system having a shunt regulator at a GCU excitation output for overvoltage protection.

FIG. 1 illustrates an embodiment of an electrical generating system 100 with a shunt regulator 116 at an excitation output of a GCU 103 for overvoltage protection. Electrical generating system 100 includes a permanent magnet generator (PMG) 101 and a generator 102. PMG 101 provides an excitation current to generator 102 via GCU 103. PMG 101 is shown for illustrative purposes only; a shunt regulator at an excitation output of a GCU for overvoltage protection may be incorporated into an electrical system having any appropriate type of generator excitation in various embodiments. Generator 102 powers AC bus 110 via line contactor 109. AC bus 110 may power one or more AC loads 115 in some embodiments. AC power from AC bus 110 is converted to DC power by transformer rectifier unit (TRU) 111, and the DC power from TRU 111 powers DC bus 112. DC loads 113*a-b* are powered by DC bus 112. Regulation point 114, located between generator 102 and line contactor 109, is connected to points of regulation (PORs) 107*a-c*; voltage information from regulation point 114 is provided to the GCU 103 by PORs 107*a-c*. DC loads 113*a-b* and AC load 115 are shown for illustrative purposes only; an electrical generating system 100 may power any appropriate number and type of loads in various embodiments. Electrical generating system 100 may be located in an aircraft in some embodiments, and DC loads 113*a-b* or AC load 115 may be flight-critical loads in the aircraft in some embodiments.

GCU 103 acts to regulate the excitation current from PMG 101 to generator 102, thereby regulating the power output of generator 102. GCU 103 as shown in FIG. 1 includes a generator control relay 108, a voltage regulator 104, overvoltage protection module 105, redundant overvoltage protection module 106, and shunt regulator 116. The excitation current from PMG 101 is sent via generator control relay 108 to voltage regulator 104 to a GCU excitation output, which is connected to the generator 102. Voltage regulator 104 acts to keep the excitation current output by GCU 103 to generator 102 output voltage at a target voltage based on input from POR 107a. Overvoltage protection module 105, redundant overvoltage protection module 106, and shunt regulator 116 are each connected to a respective POR 107b-c, which receives voltage data from regulation point 114. During normal operation, generator control relay 108 is closed, and PMG 101 provides an excitation drive voltage to generator 102 via generator control relay 108 and voltage regulator 104. PORs 107a-c are shown for illustrative purposes only, the PORs may be configured in any appropriate manner that provides voltage data from a regulation point in the electrical generating system to the GCU. Shunt regulator 116 is connected to the excitation output of the GCU 103. Overvoltage protection module 105 and redundant overvoltage protection module 106 are also shown for illustrative purposes only; a GCU may include any appropriate number or type of overvoltage protection modules. Further, redundant overvoltage protection module 106 and/or shunt regulator 116 may be located in another module separately from GCU 103 to provide functional separation in some embodiments, in order to provide additional system safety for electrical system applications with high system safety requirements.

Overvoltage conditions at regulation point 114 may be detected by either or both of overvoltage protection module 105 or redundant overvoltage protection module 106 based on input from their respective PORs 107b-c. In response to overvoltage conditions, either overvoltage protection module 105 or redundant overvoltage protection module 106 may open generator control relay 108 and/or line contactor 109, and/or may turn off voltage regulator 104. However, due to possible delays in operation of overvoltage protection module 105 and redundant overvoltage protection module 106, shunt regulator 116 is also triggered by overvoltage conditions at regulation point 114 (via POR 107c) to limit the overvoltage and protect the loads 113a-b and 115. Shunt regulator 116 acts to draw current from the excitation output of GCU 103, limiting the excitation current received by generator 102.

Figure 2:
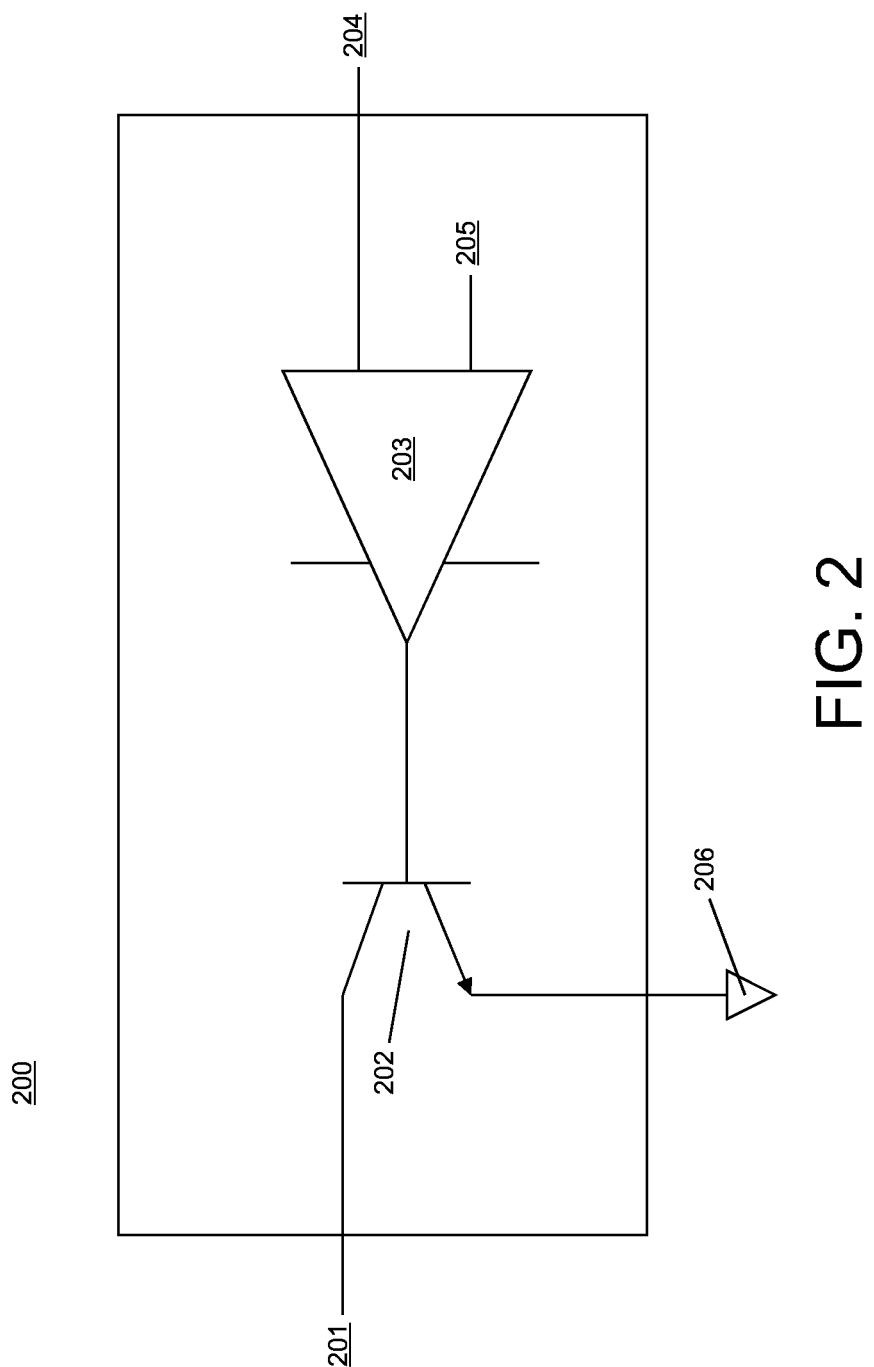
FIG. 2 illustrates an embodiment of a shunt regulator for overvoltage protection.

FIG. 2 illustrates an embodiment of a shunt regulator 200 connected to a GCU excitation output for overvoltage protection. Shunt regulator 200 may comprise shunt regulator 116 of FIG. 1 in some embodiments. Input 201 is connected to the excitation output of GCU 103, which is on the line between PMG 101 and generator 102 of FIG. 1. POR input 204 is connected to POR 107c of FIG. 1. Transistor 202 as shown in FIG. 2 comprises a NPN bipolar junction transistor (BJT), and includes a gate (base), source (collector), and drain (emitter); the source of transistor 202 is connected to input 201, the drain of transistor 202 is connected to ground connection 206, and the gate is connected to the output of operational amplifier 203. Operational amplifier 203 receives POR input 204 and reference voltage 205. The reference voltage 205 is selected such that the output of generator 102 will be limited to a voltage that is below a predetermined ceiling voltage at which loads 113a-b or 115 may be damaged when shunt regulator 116 is triggered. When the voltage from POR 107c at input 204 exceeds the reference voltage 205 (i.e., an overvoltage condition exists at regulation point 114), the operational amplifier 203 biases the transistor gate voltage to on, such that transistor 202 draw current from the PMG 101 at input 201. This overloads the exciter drive of generator 102, causing the current available to the exciter of generator 102 to drop, and limiting the output of the generator 102. Reference voltage 205 may be selected such that the output of generator 102 is be greater than an overvoltage protection limit at which the overvoltage protection modules 105-106 are triggered in some embodiments, in which case the shunt regulator 116 protects the loads 113a-b and 115 until one or both of overvoltage protection modules 105-106 act to take the generator 102 offline. In other embodiments, the reference voltage 205 is selected such that the output of generator 102 is less than an overvoltage protection limit at which the overvoltage protection modules 105-106 are triggered, in order to prevent the generator 102 from approaching the predetermined ceiling voltage that may damage the loads 113a-b and 115. Shunt regulator 200 is shown for illustrative purposes only; the shunt regulator 116 of FIG. 1 may have any appropriate configuration for overloading the exciter drive of generator 102.

Figure 3:
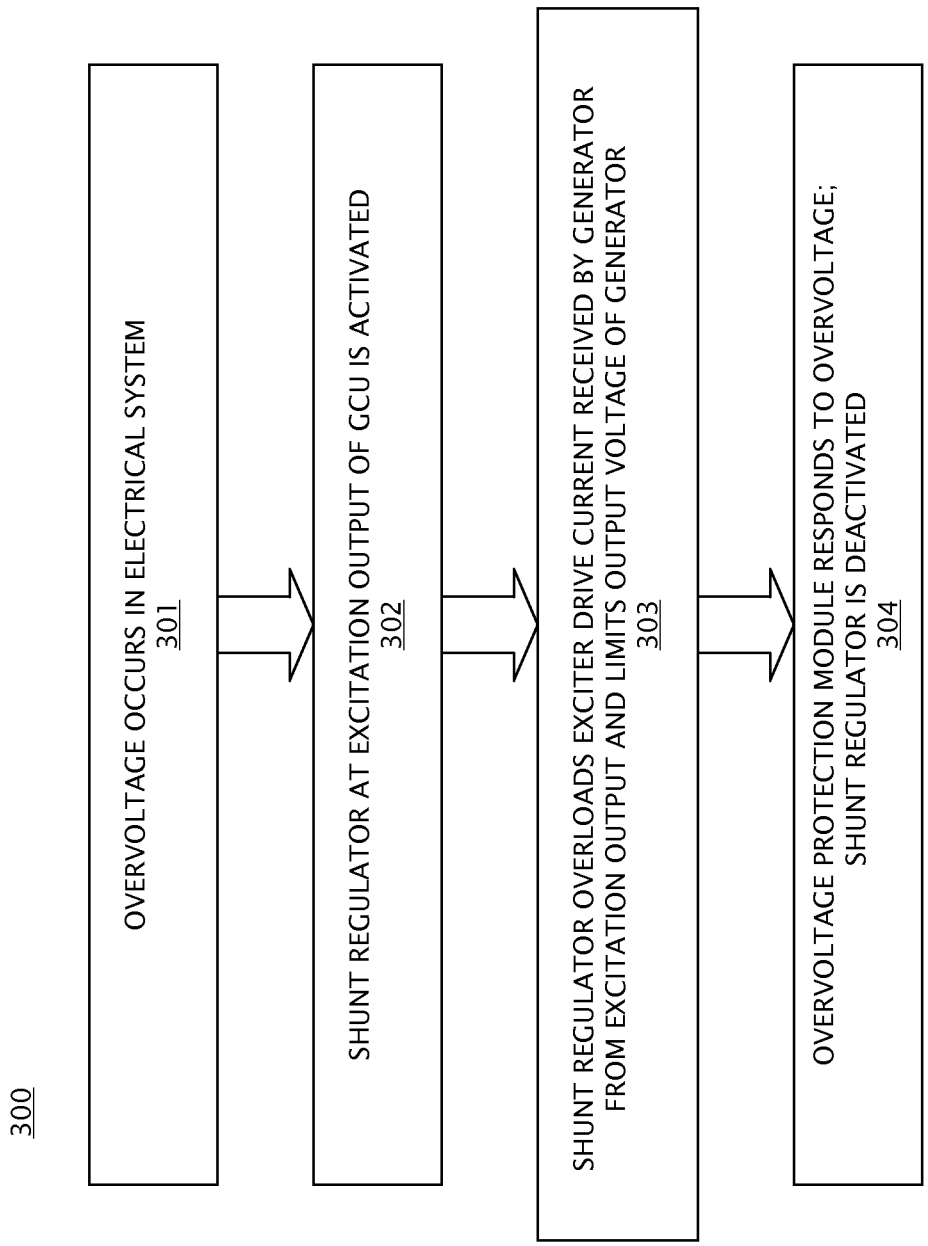
FIG. 3 illustrates an embodiment of a method of operating an electrical generating system having a shunt regulator at a GCU excitation output for overvoltage protection.

FIG. 3 illustrates an embodiment of a method 300 of operating a GCU having a shunt regulator for overvoltage protection. Method 300 is discussed with reference to FIG. 1. In block 301, an overvoltage occurs in electrical generating system 100, i.e., a voltage at regulation point 114 exceeds a reference voltage. In block 302, the shunt regulator 116 connected to the excitation output of GCU 103 is activated. In block 303, the shunt regulator 116 overloads the excitation output of GCU 103, limiting the output of the generator 102 below a predetermined ceiling voltage. In block 304, in embodiments in which the reference voltage is selected such that the output of generator 102 is greater than an overvoltage protection limit at which the overvoltage protection modules 105-106 are triggered, one or both of overvoltage protection modules 105-106 respond to the overvoltage, and the shunt regulator is deactivated.

The technical effects and benefits of exemplary embodiments include relatively fast response to overvoltage conditions in an electrical generating system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrical system, comprising:
   a generator;
   a generator control unit connected to the generator;
   a shunt regulator connected to an excitation output of the generator control unit, wherein the shunt regulator is configured to overload the excitation output of the generator control unit based on an overvoltage condition at an output of the generator, such that an output voltage at the output of the generator does not exceed a predetermined ceiling voltage during the overvoltage condition; and an overvoltage protection module, the overvoltage protection module configured to, based on the overload condition, de-excite the generator and disconnect the generator after the overloading of the excitation output of the generator control unit by the shunt regulator.

2. The electrical system of claim 1, further comprising one or more loads powered by an output voltage from the output of the generator, and wherein the predetermined ceiling voltage is a voltage at which the one or more loads experience damage.

3. The electrical system of claim 2, wherein the generator comprises a permanent magnet generator that is configured to provide the excitation current to a main generator via the excitation output of the generator control unit, and wherein the main generator outputs the output voltage to the one or more loads.

4. The electrical system of claim 1, wherein the overvoltage protection module is configured to de-excite and disconnect the generator by at least one of:
opening a line contactor located between the generator and one or more loads that are powered by the generator;
opening a generator control relay in the generator control unit; and
turning off a voltage regulator in the generator control unit.

5. The electrical system of claim 1, wherein the shunt regulator comprises:
an operational amplifier, the operational amplifier configured to receive a reference voltage and the output voltage of the generator as inputs; and
a transistor, the transistor configured to receive an output of the operational amplifier and a voltage from the excitation output.

6. The electrical system of claim 5, wherein the reference voltage is selected such that an output voltage of the generator is below the predetermined ceiling voltage but above a trigger voltage of an overvoltage protection module, the overvoltage protection module configured to react to the overvoltage condition, when the shunt regulator is activated.

7. The electrical system of claim 6, wherein the shunt regulator is configured to deactivate based on the overvoltage protection module de-exciting and disconnecting the generator.

8. The electrical system of claim 5, wherein the reference voltage is selected such that an output voltage of the generator is below a trigger voltage of an overvoltage protection module when the shunt regulator is activated.

9. The electrical system of claim 1, wherein the electrical system comprises an electrical generating system of an aircraft.

10. A method for limiting an overvoltage condition in an electrical system by a shunt regulator connected to an excitation output of a generator control unit of the electrical system, the method comprising:
activating the shunt regulator based on the overvoltage condition at the output of a generator that is controlled by the generator control unit; and
overloading the excitation output of the generator control unit by the shunt regulator such that an output voltage of the generator connected to the generator control unit does not exceed a predetermined ceiling voltage during the overvoltage condition; and
after overloading the excitation output of the generator control unit by the shunt regulator, de-exciting the generator and disconnecting the generator by an overvoltage protection module.

11. The method of claim 10, further comprising one or more loads powered by an output voltage from the output of the generator, and wherein the predetermined ceiling voltage is a voltage at which the one or more loads experience damage.

12. The method of claim 11, wherein the generator comprises a permanent magnet generator that is configured to provide the excitation current to a main generator via the excitation output of the generator control unit, and wherein the main generator outputs the output voltage to the one or more loads.

13. The method of claim 10, further comprising:
wherein de-exciting and disconnecting the generator by the overvoltage protection module comprises at least one of:
opening a line contactor located between the generator and one or more loads that are powered by the generator;
opening a generator control relay in the generator control unit by opening a line contactor located between the generator and one or more loads that are powered by the generator; and
turning off a voltage regulator in the generator control unit; and
wherein the method further comprises deactivating the shunt regulator based on the de-exciting and disconnecting of the generator by the overvoltage protection module.

14. The method of claim 10, wherein the shunt regulator comprises:
an operational amplifier, the operational amplifier configured to receive a reference voltage and the output voltage of the generator as inputs; and
a transistor, the transistor configured to receive an output of the operational amplifier and a voltage from the excitation output.

15. The method of claim 14, wherein activating the shunt regulator based on the overvoltage condition comprises detecting that the output voltage of the generator is greater than the reference voltage by the operational amplifier.

16. The method of claim 14, wherein overloading the excitation output of the generator control unit by the shunt regulator such that the output voltage of the generator connected to the generator control unit does not exceed a predetermined ceiling voltage during the overvoltage condition comprises limiting a voltage output to the generator on the excitation output to the reference voltage by the transistor.

17. The method of claim 14, wherein the reference voltage is selected such that the output voltage of the main generator is below the predetermined ceiling voltage but above a trigger voltage of an overvoltage protection module when the shunt regulator is activated.

18. The method of claim 14, wherein the reference voltage is selected such that the output voltage of the generator is below a trigger voltage of an overvoltage protection module when the shunt regulator is activated.

19. The method of claim 10, wherein the electrical system comprises an electrical generating system of an aircraft.

* * * * *